US010942786B2

(12) United States Patent
Lacey et al.

(10) Patent No.: US 10,942,786 B2
(45) Date of Patent: Mar. 9, 2021

(54) NETWORK MANAGEMENT

(71) Applicant: Comptel Corporation, Helsinki (FI)

(72) Inventors: Stephen Lacey, Nummela (FI); Daniel Tyrode, Twyford (GB)

(73) Assignee: Comptel Corporation, Helsinki (FI)

( * ) Notice: Subject to any disclaimer, the term of this patent is extended or adjusted under 35 U.S.C. 154(b) by 67 days.

(21) Appl. No.: 15/557,557

(22) PCT Filed: Mar. 13, 2015

(86) PCT No.: PCT/FI2015/050167
§ 371 (c)(1),
(2) Date: Sep. 12, 2017

(87) PCT Pub. No.: WO2016/146878
PCT Pub. Date: Sep. 22, 2016

(65) Prior Publication Data
US 2018/0060135 A1 Mar. 1, 2018

(51) Int. Cl.
G06F 9/50 (2006.01)
H04W 24/02 (2009.01)
G06F 9/455 (2018.01)
H04L 12/24 (2006.01)

(52) U.S. Cl.
CPC ........ G06F 9/5077 (2013.01); G06F 9/45558 (2013.01); H04L 41/04 (2013.01); H04L 41/0803 (2013.01); H04L 41/5054 (2013.01); H04L 41/5096 (2013.01); H04W 24/02 (2013.01)

(58) Field of Classification Search
CPC ... G06F 9/5077; G06F 9/45558; H04L 41/04; H04L 41/0803; H04L 41/5054; H04L 41/5096; H04W 24/02

USPC ........................................................ 709/226
See application file for complete search history.

(56) References Cited

U.S. PATENT DOCUMENTS

| 6,058,307 | A | * | 5/2000 | Garner | ............... | H04B 7/18539 |
|---|---|---|---|---|---|---|
| | | | | | | 455/428 |
| 9,590,879 | B2 | * | 3/2017 | Wray | ...................... | H04L 43/08 |
| 2009/0077264 | A1 | * | 3/2009 | Machida | ............... | G06F 16/273 |
| | | | | | | 709/248 |
| 2009/0144393 | A1 | * | 6/2009 | Kudo | .................... | G06F 9/5044 |
| | | | | | | 709/218 |
| 2009/0300605 | A1 | * | 12/2009 | Edwards | ............... | G06F 9/5077 |
| | | | | | | 718/1 |

(Continued)

FOREIGN PATENT DOCUMENTS

CN 103442034 A 12/2013

OTHER PUBLICATIONS

European Patent Office, European Search Report issued in EP15191238, dated Nov. 11, 2016.

(Continued)

Primary Examiner — Kristie D Shingles

(57) ABSTRACT

According to an example aspect of the present invention, there is provided a system comprising a memory configured to store information characterizing network management actions that have occurred in the past, and at least one processing core configured to initiate a network management action based at least in part on the stored information, the network management action involving at least one virtualized network function.

23 Claims, 6 Drawing Sheets

(56) References Cited

U.S. PATENT DOCUMENTS

| | | | |
|---|---|---|---|
| 2011/0119748 A1* | 5/2011 | Edwards | G06F 9/5077 726/12 |
| 2014/0031006 A1 | 1/2014 | Moore et al. | |
| 2014/0047440 A1* | 2/2014 | Da Silva | G06F 9/5077 718/1 |
| 2014/0082275 A1 | 3/2014 | Zhang | |
| 2014/0201374 A1 | 7/2014 | Ashwood-Smith et al. | |
| 2015/0058641 A1* | 2/2015 | Parikh | H04L 67/42 713/300 |
| 2016/0078342 A1* | 3/2016 | Tang | H04L 41/00 706/47 |
| 2016/0164962 A1* | 6/2016 | Ghosh | H04L 67/1008 709/223 |
| 2016/0210175 A1* | 7/2016 | Morimura | G06F 9/45533 |

OTHER PUBLICATIONS

Hahn, Wolfgang et al: "GW elasticity in data centers: Options to adapt to changing traffic profiles in control and user plane", 2015 18th International Conference on Intelligence in Next Generation Networks, IEEE, Feb. 17, 2015, pp. 16-22, XP032758456, DOI: 10.1109/ICIN.2015.7073801.

Karagiannis, Gerogios et al: "Mobile Cloud Networking: Virtualisation of Cellular Networks", 2014 21st International Conference on Telecommunications (ICT), IEEE, May 4, 2014, pp. 410-415, XP032612088, DOI: 10.1109/ICT.2014.6845149, ISBN: 978-1-4799-5139-0.

"Network Functions Virtualisation (NFV); Architectural Framework", 3GPP Draft; GS_NFV002V010101P, 3rd Generation Partnership Project (3GPP), Mobile Competence Centre; 650, Route Des Lucioles; F-06921 Sophia-Antipolis Cedex, France, Nov. 4, 2013, XP050767875, Retrieved from the Internet: URL: http://www.3gpp.org/ftp/tsg_sa/WG5_TM/TSGS5_92/Docs/.

"Network Functions Virtualisation (NFV); Use Cases", 3GPP Draft; GS_NFV002V010101P, 3rd Generation Partnership Project (3GPP), Mobile Competence Centre; 650, Route Des Lucioles; F-06921 Sophia-Antipolis Cedex, France, Nov. 4, 2013, XP050767874, Retrieved from the Internet: URL: http://www.3gpp.org/ftp/tsg_sa/WG5_TM/TSGS5_92/Docs/.

* cited by examiner

NETWORK MANAGEMENT

PRIORITY

This application is a U.S. national application of PCT-application PCT/FI2015/050167 filed on Mar. 13, 2015, the contents of all of which are incorporated herein by reference.

FIELD OF INVENTION

The present invention relates to the field of network management, such as for example management of a communication network with virtualized functions.

BACKGROUND OF INVENTION

Communication networks, such as for example cellular communication networks, are comprised of network nodes. The network nodes of a network may be subdivided into different node types, for example, a cellular communication network may comprise base stations, base station controllers, switches, gateways and application functions. An internet protocol, IP, network may comprise routers and gateways.

When designing a network, planners may estimate loading situations in a coverage area of the network. For example, in busy sections of cities it may be estimated that communication occurs more often, and at a higher intensity, than in outlying areas. Therefore, in the case of a cellular network, cells in busier areas may be made smaller, and base stations assigned to control these smaller cells may be furnished with sufficient data processing capability to handle high peak loads. For example, the base stations may be equipped with several data processing cards. Likewise, network nodes tasked with conveying data to and from base stations with high anticipated peak loads may be dimensioned to be capable of handling these high loads.

When network nodes dimensioned to handle high loads experience lower loads, for example at night, their instantaneous load factors may be low. On the other hand, in case usage patterns of a network change, for example, if an area that previously experienced only low usage becomes more highly loaded, capacity may be added to base stations and, possibly, to other nodes serving that area of the network. Such adding may involve installing more data processing cards and/or transceivers into base stations to cope with the load. Peak loads may increase in previously lightly loaded areas as cities or other areas develop. For example, the opening of a new airport, train station or simply the construction of a new apartment building may modify usage patterns of communication networks that are active in the area.

Virtualization of network functions may be employed to simplify network maintenance. In a network where functions have been, at least in part, virtualized, virtualized network functions may be run as software entities on commodity server computers, which may be located in a datacentre, for example.

SUMMARY OF THE INVENTION

The invention is defined by the features of the independent claims. Some specific embodiments are defined in the dependent claims.

According to a first aspect of the present invention, there is provided a system comprising a memory configured to store information characterizing network management actions that have occurred in the past, and at least one processing core configured to initiate a network management action based at least in part on the stored information, the network management action involving at least one virtualized network function.

Various embodiments of the first aspect may comprise at least one feature from the following bulleted list:
- the network management action comprises at least one of the following: increasing resources allocated to a virtualized network function, decreasing resources allocated to a virtualized network function, starting a virtualized network function instance, and terminating a virtualized network function instance
- the information characterizing network management actions that have occurred in the past comprises at least one of the following: information identifying when past network management actions have occurred, at least one pattern identified in past network management actions, and at least one propensity score associating a network management action with a network operating condition
- the at least one processing core is configured to initiate the network management action based jointly on the at least one propensity score and the network operating condition
- the at least one virtualized network function comprises at least one of the following: a virtualized base station function, a virtualized call session control function, CSCF, a virtualized switching centre, a virtualized mobility management entity, a virtualized home subscriber server, a virtualized equipment identity register and a virtualized gateway function
- the system is configured to override a first network management action request based at least in part on the stored information
- the first network management action request comprises a request to terminate a first virtualized network function and the stored information indicates that increased loading is likely in the near future
- the first network management action request comprises a request to increase resources allocated to a first virtual network function, and the at least one processing core is configured to, based at least in part on the stored information, increase resources allocated to a second virtualized network function and leave resources of the first virtualized network function unmodified
- the memory and the at least one processing core are comprised in a virtualized cellular communication network management device and the system further comprises a network functions virtualization orchestrator function configured to, responsive to a trigger from the virtualized cellular communication network management device, cause the network management action to be implemented
- the system comprises a first node configured to determine, based on the information identifying when past network management actions have occurred, at least one of the at least one pattern and the at least one propensity score
- the first node comprises the virtualized cellular communication network management device According to a second aspect of the present invention, there is provided a method comprising storing information characterizing network management actions that have occurred in the past, and initiating a network management action based at least in part on the stored information, the network management action involving at least one virtualized network function.

Various embodiments of the second aspect may comprise at least one feature corresponding to a feature comprised in the preceding bulleted list laid out in connection with the first aspect.

According to a third aspect of the present invention, there is provided a database or big data storage comprising a memory configured to store information characterizing network management actions involving at least one virtualized network function that have occurred in the past, and at least one pattern characterizing the information.

According to a fourth aspect of the present invention, there is provided an apparatus comprising at least one processing core and at least one memory including computer program code, the at least one memory and the computer program code being configured to, with the at least one processing core, cause the apparatus at least to store information characterizing network management actions that have occurred in the past, and initiate a network management action based at least in part on the stored information, the network management action involving at least one virtualized network function.

According to a fifth aspect of the present invention, there is provided an apparatus comprising means for storing information characterizing network management actions that have occurred in the past, and means for initiating a network management action based at least in part on the stored information, the network management action involving at least one virtualized network function.

According to a sixth aspect of the present invention, there is provided a non-transitory computer readable medium having stored thereon a set of computer readable instructions that, when executed by at least one processor, cause an apparatus to at least store information characterizing network management actions that have occurred in the past, and initiate a network management action based at least in part on the stored information, the network management action involving at least one virtualized network function.

According to a seventh aspect of the present invention, there is provided a method, comprising predictively triggering, from a predictive entity, a network management action relating to a virtualized network function, responsive to the triggering, requesting implementation of the network management action by transmitting an instruction from a network function virtualization orchestrator function to a virtual infrastructure manager function, and responsive to a message from the virtual infrastructure manager function, requesting configuration relating to the network management action by transmitting a message from the network function virtualization orchestrator function to a virtualized network function manager function.

Various embodiments of the seventh aspect may comprise at least one of the following two features:
- the configuration is caused by causing at least one message to be transmitted from the virtualized network function manager to the virtualized network function
- responsive to the triggering, querying by the network function virtualization orchestrator function from the virtualized network function manager function what resources are needed for implementing the network management action, and wherein the implementation is requested based at least in part on a response to the query.

According to an eighth aspect of the present invention, there is provided a computer program configured to cause a method in accordance with at least one of the second or seventh aspects to be performed.

INDUSTRIAL APPLICABILITY

At least some embodiments of the present invention find industrial application in network management and use optimization.

DETAILED DESCRIPTION OF EXAMPLE EMBODIMENTS

In networks employing virtualization of at least some functions thereof, preemptive network management actions may be triggered based on predictive methods to react more fluently to changes in network usage. Capacity may be adaptively increased and decreased, respectively, where usage is foreseen to increase or decrease, for example. A utility may thereby be obtained where computational capacity is used more efficiently and/or outage situations may be avoided as changes are initiated already before the usage changes that necessitate the changes occur.

Figure 1A:
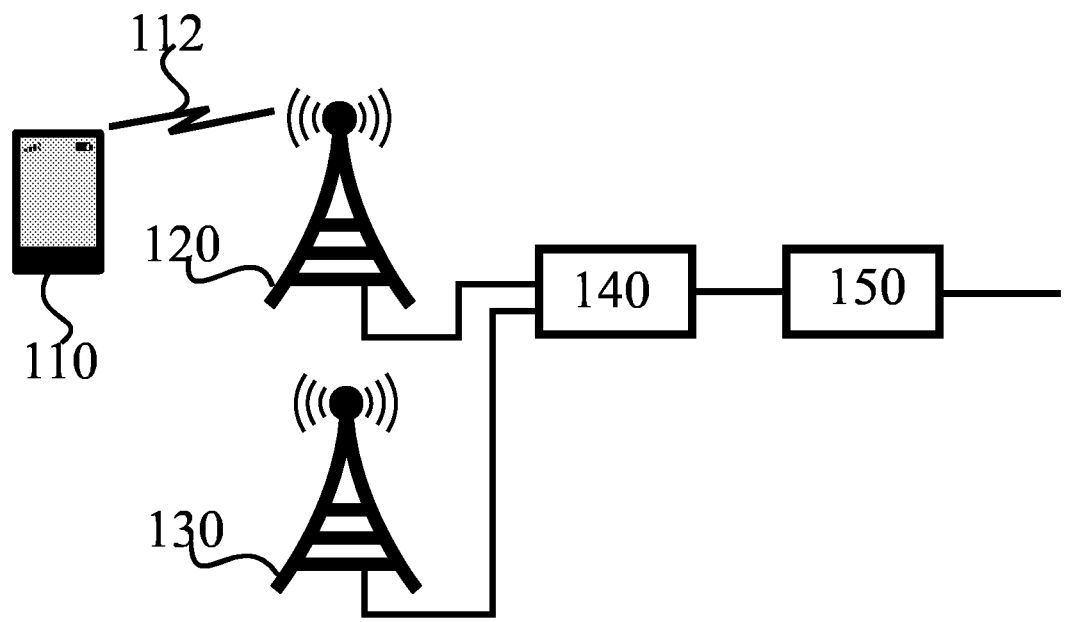
FIG. 1A illustrates an example system for explaining at least some embodiments of the present invention.

FIG. 1A illustrates an example system for explaining at least some embodiments of the present invention. In a cellular network example, mobile 110 is in communication with base station 120 via wireless link 112. Mobile 110 may comprise, for example, a smartphone, a phablet, a cellular phone, a tablet computer or a laptop computer. Wireless link 112 may be arranged to operate in accordance with a wireless technology that both mobile 110 and base station 120 are configured to support. Suitable technologies include, for example, wideband code division multiple access, WCDMA, long term evolution, LTE, and CDMA2000.

Base station 120 is operably connected to core network node 140. Core network node 140 may comprise, for example, a mobility management entity, MME, or a router. Core network node 140 is further operably connected to further core network node 150. Further core network node 150 may comprise a gateway, for example, configured to provide access to further networks, such as the Internet, for example. Thus mobile 110 may obtain access to the further networks via base station 120, core network node 140 and further core network node 150. Base station 120 may be dimensioned to be capable of serving a maximum load in the location where the cell or cells it controls are located.

Base station 130 may be similar to base station 120, and comprised in the same radio-access network as base station 120. Like base station 120, also base station 130 is operably connected to core network node 140. The connections between the base stations and core network node 140 may be wire-line connections, or alternatively they may be at least in part wireless.

Although discussed in terms of a cellular network, a non-cellular network would equally serve to illustrate an example system. Examples of non-cellular technologies include wireless local area network, WLAN, also known as Wi-Fi, and worldwide interoperability for microwave access, WiMAX. Embodiments of the present invention may also be applied, in suitable form, to wire-line networks, such as IP networks, where wireless links do not occur.

Figure 1B:
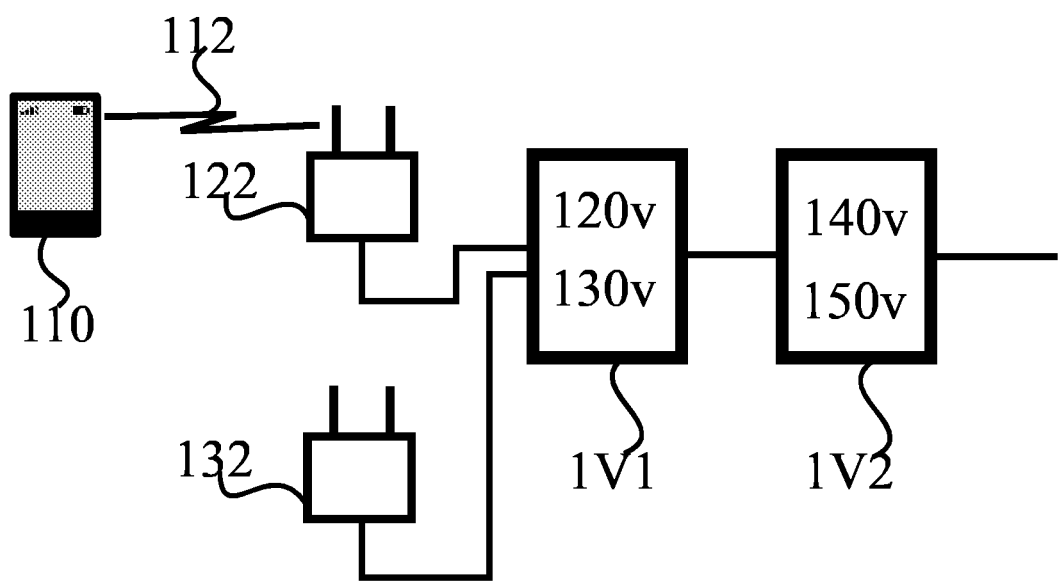
FIG. 1B illustrates an example system capable of supporting at least some embodiments of the present invention.

FIG. 1B illustrates an example system capable of supporting at least some embodiments of the present invention. Like numbering in FIG. 1B denotes like structure as in FIG. 1A. In the system of FIG. 1B, mobile 110 has a wireless link 112 with radio node 122. Radio node 122 is a reduced version of base station 120 comprising radio hardware but less, or no, information processing functions. Radio node 132 likewise takes the place of base station 130 in the system of FIG. 1B. Radio node 122 and radio node 132 are both separately connected with server 1V1, which comprises a computer system configured with computing resources, such as processing cores and memory, arranged to be able to run the information processing capabilities of base stations of FIG. 1A that are absent in the radio nodes of FIG. 1B. In other words, compared to the system of FIG. 1A, at least part of the information processing functions of base stations 120 and 130 have been moved to server 1V1 in the system of FIG. 1B.

The information processing functions relating to radio node 122 that take place in server 1V1 are denoted as virtualized base station 120v. The information processing functions relating to radio node 132 that take place in server 1V1 are denoted as virtualized base station 130v.

Server 1V2 is in the system of FIG. 1B configured to run virtualized versions of core network nodes. In the system of FIG. 1B, server 1V2 runs a virtualized core network node 140v offering the same functionality as core network node 140 in FIG. 1A, and a virtualized further core network node 150V offering the same functionality as further core network node 150 in FIG. 1A. In use virtualized base station 120v may receive information from radio node 122 and perform processing operations on the received information. For example, virtualized base station 120v may forward information it has processed to virtualized core network node 140v in server 1V2.

Servers 1V1 and 1V2 may be based on generic computation technology, such as a set of x86-architecture multi-core processors or reduced instruction set computing, RISC, processors, for example. Server 1V1 need not be based on the same computation technology as server 1V2.

In general, a virtualized network function may comprise a software entity on generic computing hardware that is configured to perform according to a same specification as a corresponding network function that has not been virtualized, that is, one that runs on dedicated hardware. In other words, a virtualized network function may comprise a software implementation of a logical network node of a communication network. This has the effect that in terms of other network elements, these other elements needn't know whether the network element has been virtualized or no. Therefore, a virtualized call session control function, CSCF, for example, can be sent the same kinds of messages as a non-virtualized CSCF.

The system of FIG. 1B offers advantages over the system of FIG. 1A. In detail, virtualized base station 120v may be scaled according to need, whereas base station 120 must be dimensioned for the maximum expected load at all times. For example, when load is light, virtualized base station 120v may be run with a few, or only one, processing core in server 1V1, while other processing cores of server 1V1 may be used for other processing tasks, such as grid computing, for example. As a response to increasing load via radio node 122, virtualized base station 120v may be allocated more processing cores in a dynamic network management action.

The system of FIG. 1B may record network management actions that are performed, each network management action involving at least one virtualized network function. Virtualized network functions may comprise, for example, virtualized base stations and/or virtualized core network nodes. The network management action may comprises at least one of the following: increasing resources allocated to a virtualized network function, decreasing resources allocated to a virtualized network function, starting a virtualized network function instance, and terminating a virtualized network function instance.

Increasing resources allocated to a virtualized network function may comprise allocating at least one more processing core and/or more memory to the virtualized network function. Alternatively to allocating an entire processing core, a timeshare of a processing core may be allocated to the virtualized network function. A timeshare may comprise, for example 25% of clock cycles or 50% of clock cycles of a processing core. Decreasing resources allocated to a virtualized network function may comprise de-allocating a processing core, a timeshare of a processing core and/or memory from the virtualized network function.

Starting a virtualized network function instance may comprise initializing, for example based at least in part on a template, a new virtualized network function. In terms of FIG. 1B, this might comprise, for example, initializing a further virtualized core network node, "160v" in server 1V2. The new virtualized network function, or node, may be allocated resources in terms of at least one processor core and memory. Terminating a virtualized network function may correspondingly comprise ending processor tasks that run the virtualized network function. Terminating may be smooth in nature, wherein, for example, any users served by a virtualized network function that is to be terminated may be handed over to another virtualized network function, to avoid broken connections.

Alternatively to two servers 1V1 and 1V2, another number of servers may be employed in dependence of the embodiment and network implementation. For example, one, three or seven servers may be used.

The system of FIG. 1B may perform network management actions responsive to load status, congestion or user intervention. When the system has access to recorded information concerning past network management actions, the system may use the recorded information to predict changes in network usage, to pre-emptively, or predictively, perform network management actions. For example, if the network has knowledge of a usage pattern according to which usage will increase in a certain segment of the network, it may re-allocate resources to virtualized network functions that serve that segment. Usage patterns may occur, for example, as users travel to and from work, for example to consume streaming media content at home in the evenings. Thus residential areas may see comparatively little traffic during the day, but relatively heavy data usage in the evenings.

Where the network can act predictively, as opposed to responsive to already developing overload, high load or low load situations, the network can reallocate resources in a smoother way. In some cases, without predictive operation outage might occur in case load picks up rapidly in a segment of the network and the network cannot adapt to the changing load fast enough. Using a predictive approach, resources may be freed from other uses before the need to allocate them to virtualized network functions with increasing load occurs. In other words, predictive resource allocation increases the flexibility at which a network operator can, for example, rent out unused capacity to grid computing. The network can smoothly run down or hibernate grid computing tasks, for example, and begin re-allocating resources, such as processing cores and/or memory, based on a predicted need.

A database or big data storage such as Hadoop may be arranged to store information characterizing network management actions involving at least one virtualized network function that have occurred in the past, and at least one pattern characterizing the information. A management node may comprise such a database, or big data storage system, to predictively trigger network management actions.

In some embodiments, a network may use a predictive approach to override network management action requests. For example, where a virtualized network function reports such a low load factor as to normally cause a termination of the virtualized network function, the network may decide to retain the virtualized network function in case the network predictively expects traffic to increase for the virtualized network function concerned in the near future. As another example, where a virtualized network function requests additional resources to be allocated to it due to load, the network may decide that in light of expected development in usage of the network, a more appropriate change is to increase the resources of another virtualized network function. In that case, the network may leave the requesting virtualized network function with unchanged resources, but increase resources allocated to another virtualized network function to enable the network to flexibly cope with dynamically developing usage. A request for additional resources may be implicit, for example, a virtualized network function may report a high load, responsive to which the network would normally allocate additional resources to reduce the load factor of the affected virtualized network function.

Figure 2:
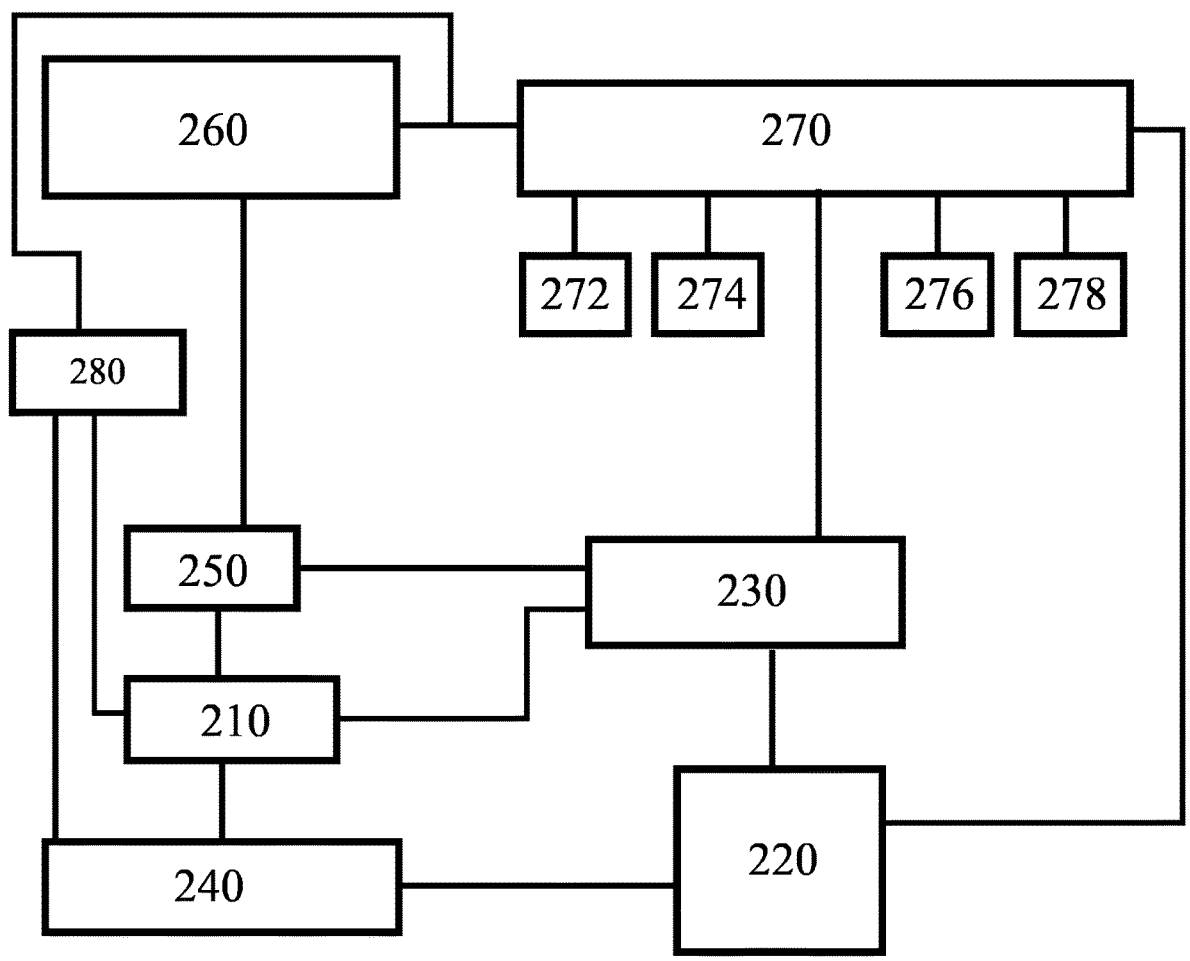
FIG. 2 illustrates an example network architecture in accordance with at least some embodiments of the present invention.

FIG. 2 illustrates an example network architecture in accordance with at least some embodiments of the present invention. In FIG. 2, VNF 210 comprises a virtualized network function, such as for example a virtualized network function as described above in connection with FIG. 1B. VNF 210 has an interface with VNF manager 230, wherein VNF manager 230 may be configured to initiate network management actions, for example, responsive to changes in a loading level of virtualized network functions. VNF manager 230 has an interface with virtualized infrastructure manager, VIM, 220. VIM 220 may implement a monitoring function to detect virtualized network functions that cross loading or other predefined thresholds, to responsively trigger network management actions. For example, where a loading level exceeds a first threshold, more resources may be allocated to the virtualized network function, and/or where the loading level decreases below a second threshold, resources may be allocated from the virtualized network function to other uses. NFVO 270 and/or another node may be configured to respond to predefined or machine-learned propensity scores, wherein a propensity score associates a network management action with at least one operating condition of the network. The architecture may comprise a plurality of VNFs 210, VIMs 220 and/or a plurality of VNF managers 230.

Both VNF 210 and VIM 220 have interfaces to network functions virtualization infrastructure, NFVI, 240. NFVI 240 may provide a set of hardware and software components that build up the environment in which VNFs are deployed. VNF 210 further has an interface with element manager, EM, 250. EM 250 may provide end-user functions for management of a set of related types of network elements which may include network elements with virtualized network functions or non-virtualized network functions, or both. These functions may be divided into two main categories: Element Management Functions and Sub-Network Management Functions. In some embodiments, EM 250 may be configured to take decisions concerning network management actions, and to cause the decisions to be implemented by signalling concerning them to VNF manager 230, for example. EM 250 has an interface with operational support systems and/or business support systems, OSS/BSS 260. OSS/BSS 260 may be configured to support end-to-end telecommunication services. OSS/BSS 260 may implement load monitoring. OSS/BSS 260 in turn has an interface with NFV Orchestrator, NFVO, 270. NFVO 270 may comprise a functional block that manages network service, NS, lifecycles and coordinates the management of the NS lifecycles, VNF lifecycles and NFVI 240 resources to ensure an optimized allocation of resources and connectivity. NFVO 270 has interfaces with each of NS catalogue 272, VNF catalogue 274, network functions virtualization, NFV, instances 276 and NFVI resources 278. VIM 220 may further have an interface with NFVO 270. VNF manager 230 may likewise have an interface with NFVO 270.

In some embodiments, a predictive entity 280 is configured to act predictively and trigger network management actions in the system illustrated in FIG. 2. For example, predictive entity 280 may instruct NFVO 270 to implement a predictively determined network management action in the network of FIG. 2. Predictive entity 280 has an interface, such as for example a standard interface, with NFVO 270. To enable this, predictive entity may be configured to receive and collect information on network management actions performed in the network of FIG. 2 and determine patterns therein. Predictive entity 280 may be arranged to receive information from at least one VNF 210, and/or at least one VIM 220 and/or at least one NFVI 240. Alternatively, predictive entity 280 may be configured with information describing patterns it is to use in predictively triggering network management actions.

Predictive entity 280 may comprise an interface to NFV 210 and/or NFVI 240, and a node configured to collect data therefrom. Predictive entity 280 may comprise a mediation service, a database or a big data storage for storing the collected data, a node configured to analyse the data, for example in real time, and to create a predictive analysis based on the data, and a node/interface configured to inform NFVO 270 directly or through OSS/BSS 260. Predictive entity 280 can be run as a virtual service.

In some embodiments, to implement a predictively determined network management resource scaling action, NFVO 270 instructs VIM 220 to give additional resources for at least one VNF 210. When VIM 220 acknowledges the additional resources, the NFVO 270 may inform the VNFM 230 to scale resources. As an option the NFVO 270 may first request the VNFM 230, if the VNF's are allowed to scale and what resources are needed to scale. In case of scaling down or in, NFVO 270 may inform VNFM 230 to scale VNF's, VNFM 230 may scale the resources and inform NFVO 270 about it, then NFVO 270 may inform the VIM 220 these resources are no longer used and the VIM 220 may then do so. It can also inform the NFVO 270 that the resources are no longer available.

In various embodiments, at least two entities illustrated in FIG. 2 comprise software entities arranged to run on the same hardware resource.

While FIG. 2 illustrates one example architecture, other architectures are possible in different embodiments of the invention. For example, where the network is an internet protocol, IP, network, the architecture may be simpler than that illustrated in FIG. 2.

Figure 3:
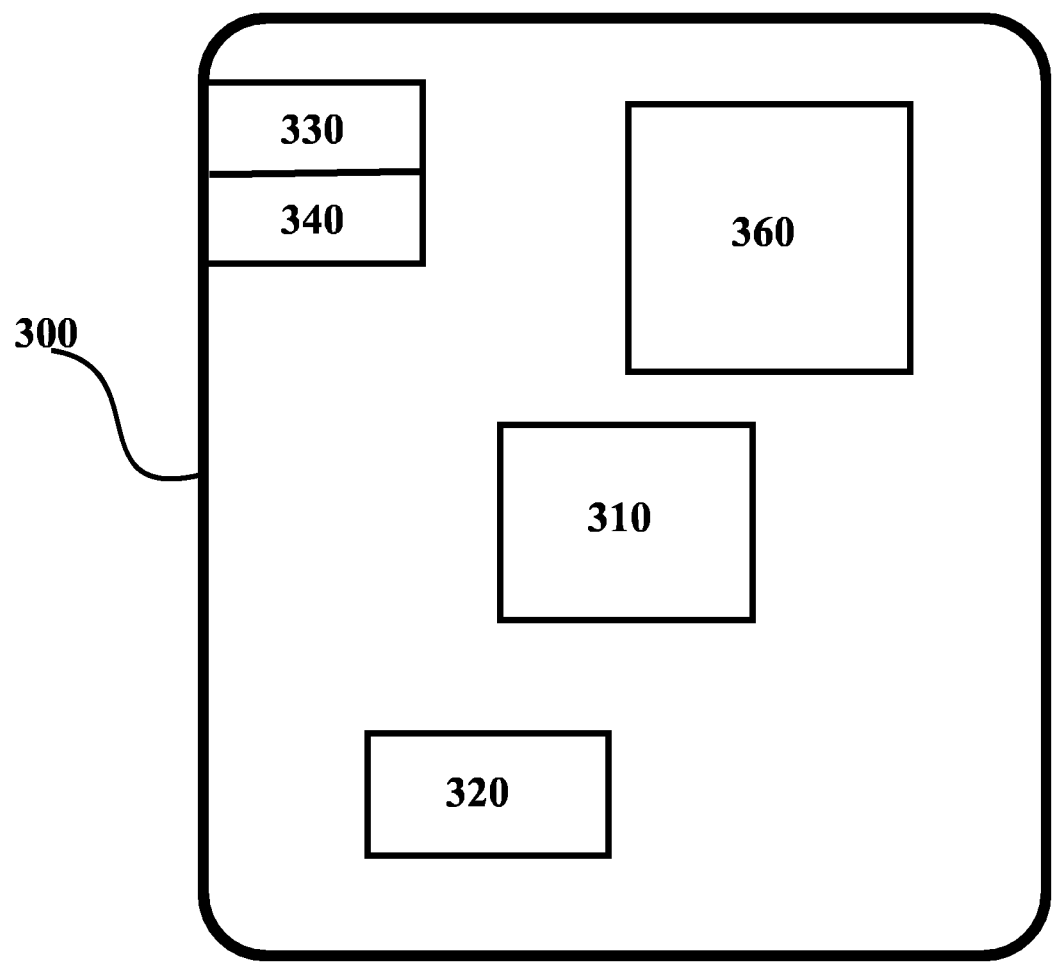
FIG. 3 illustrates an example apparatus capable of supporting at least some embodiments of the present invention.

FIG. 3 illustrates an example system capable of supporting at least some embodiments of the present invention. Illustrated is device 300, which may comprise, for example, a control node configured to control, at least in part, the operation of the network illustrated in FIG. 1B or FIG. 2. Device 300 may comprise one of the entities illustrated in the architecture of FIG. 2 that may perform monitoring and/or triggering of network management actions. Alternatively, device 300 may be comprised in a node not illustrated in FIG. 2, wherein device 300 may be configured to provide instructions to at least one node comprised in FIG. 2. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Intel Core, Intel Xeon, AMD Opteron and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one communication standard. Transmitter 330 may comprise more than one transmitter. Receiver 340 may comprise more than one receiver. Transmitter 330 and/or receiver 340 may be configured to operate in accordance with Ethernet and/or Diameter communication standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to initiate network management actions or configure loading thresholds.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, device 300 may comprise a fingerprint scanner to authenticate users. In some embodiments, device 300 lacks at least one device described above.

Processor 310, memory 320, transmitter 330 and/or receiver 340 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
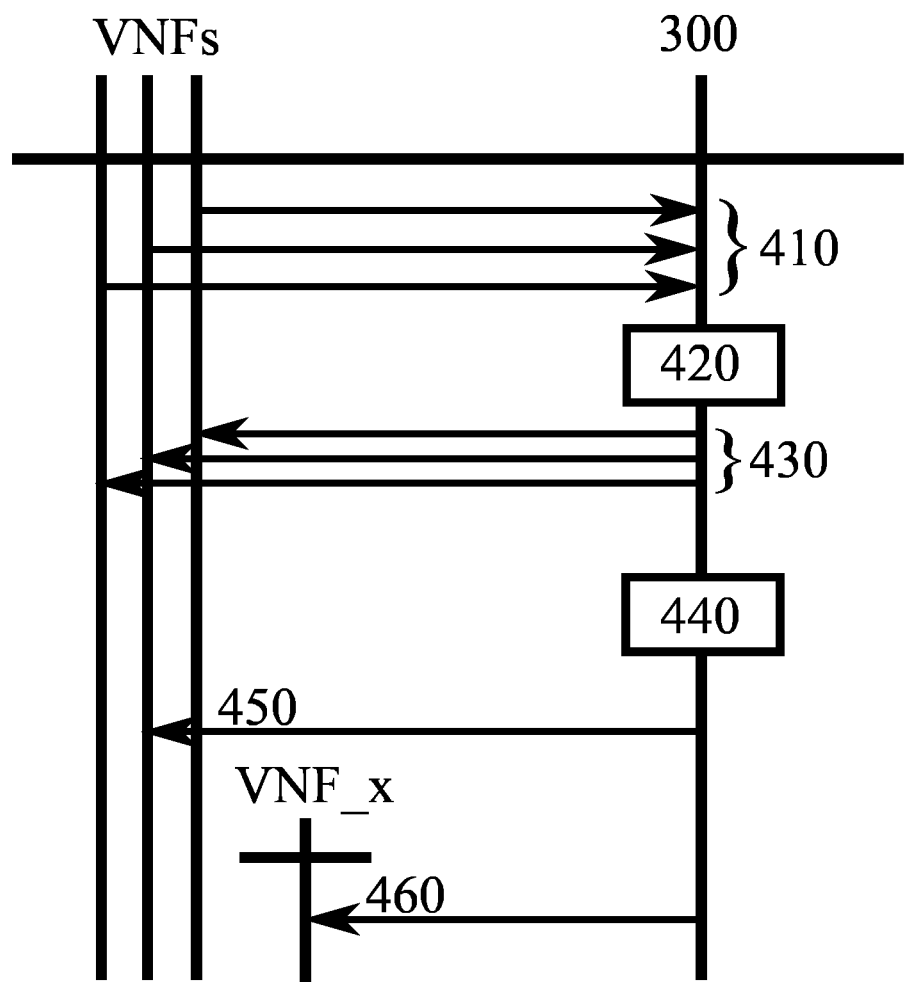
FIG. 4 illustrates signalling in accordance with at least some embodiments of the present invention.

FIG. 4 illustrates signalling in accordance with at least some embodiments of the present invention. On the vertical axes are disposed, from left to right, a set of virtualized network functions, VNFs, on the left, a control node 300, on the right. Control node 300 may correspond to the device 300 of FIG. 3, or predictive entity 280 of FIG. 2 for example. In the lower part of FIG. 4 there is a further vertical axis labelled VNF_x. The set of VNFs may change as time goes by, and the figure should not be understood so that the number of VNFs in the set should always be three, or any constant number. Control node 300 is in the illustrated example architecture tasked with managing network management actions with regard to VNFs, however the invention is by no means limited thereto, rather, in different embodiments other functions, or sets of functions may perform at least part of the actions attributed to control node 300 in FIG. 4. Time advances from the top toward the bottom. Messaging between control node 300 and the VNFs may be conducted via at least one intermediate node, such as for example an NFVO and/or VIM as described in connection with FIG. 2.

In collective phase 410, the VNFs provide indications to control node 300. The indications of phase 410 may comprise load indications advising control node 300 of load situations in individual VNFs, for example. In phase 420, control node 300 may analyse the indications received in phase 410 and determine to take actions based, at least in part, on these indications. In phase 420, control node 300 may store information concerning the indications of phase 410. The stored information may describe, for example, timestamps of received indications that enable determination of patterns in the indications of phase 410. Patterns may comprise temporal patterns, for example indicating at what times of day certain sections of the network experience high and/or low load conditions. Determination of patterns in the indications may be performed by control node 300, or by another node with which control node 300 shares the indications, at least in part. Another example of a pattern that may be derived based on the indications of phase 410 is a propensity score. A propensity score may indicate, for example, a likelihood that increasing or decreasing resources in a specific VNF will be appropriate if certain network conditions exist. For example, a propensity score may indicate a statistical probability that increasing resources will become necessary within 10 minutes, in case a load factor of a specific VNF increases by 30% within a previous 10 minutes.

In phase 430, control node 300 may initiate at least one network management action with regard to the set of VNFs, at least in part responsive to the indications received in phase 410. The network management action may comprise, for example, a network management action of a type described above. Phases 410, 420 and 430 may overlap in time, such that control node 300 may initiate a network management action responsive to an individual indication received from one VNF comprised in the set of VNFs. Phases 410, 420 and 430 may be seen as a reactive stage of operation, where the network reacts to indications received from VNFs and also gathers information enabling it to begin acting, at least partly, in a predictive way later on.

Phase 440 comprises control node 300 acting predictively based at least in part on the information stored in phase 420. For example, where control node 300 determines that virtualized base station resources usually need to be increased in a certain section of the network at 18:00 in the evening, control node 300 may increase the resources already at 17:55. Thus as usage increases at 18:00, a load factor of a virtualized base station does not increase as much as it would have, had the resources not been already increased five minutes earlier. Phase 450 illustrates an example instruction from control node 300 to increase resources in a VNF. In phase 460, control node 300 predictively starts a new virtualized network function instance based at least in part on the information stored in phase 420. The new virtualized network function, VNF_x, may comprise a virtualized call session control function, for example. VNF_x may be initialized in a same physical computer or computer set as the other VNFs of FIG. 4, for example. In at least some embodiments, addition to increasing resources of a VNF and starting a new VNF, control node 300 may instruct resources of a VNF to be reduced, or that a VNF is to be terminated, as discussed above.

Figure 5:
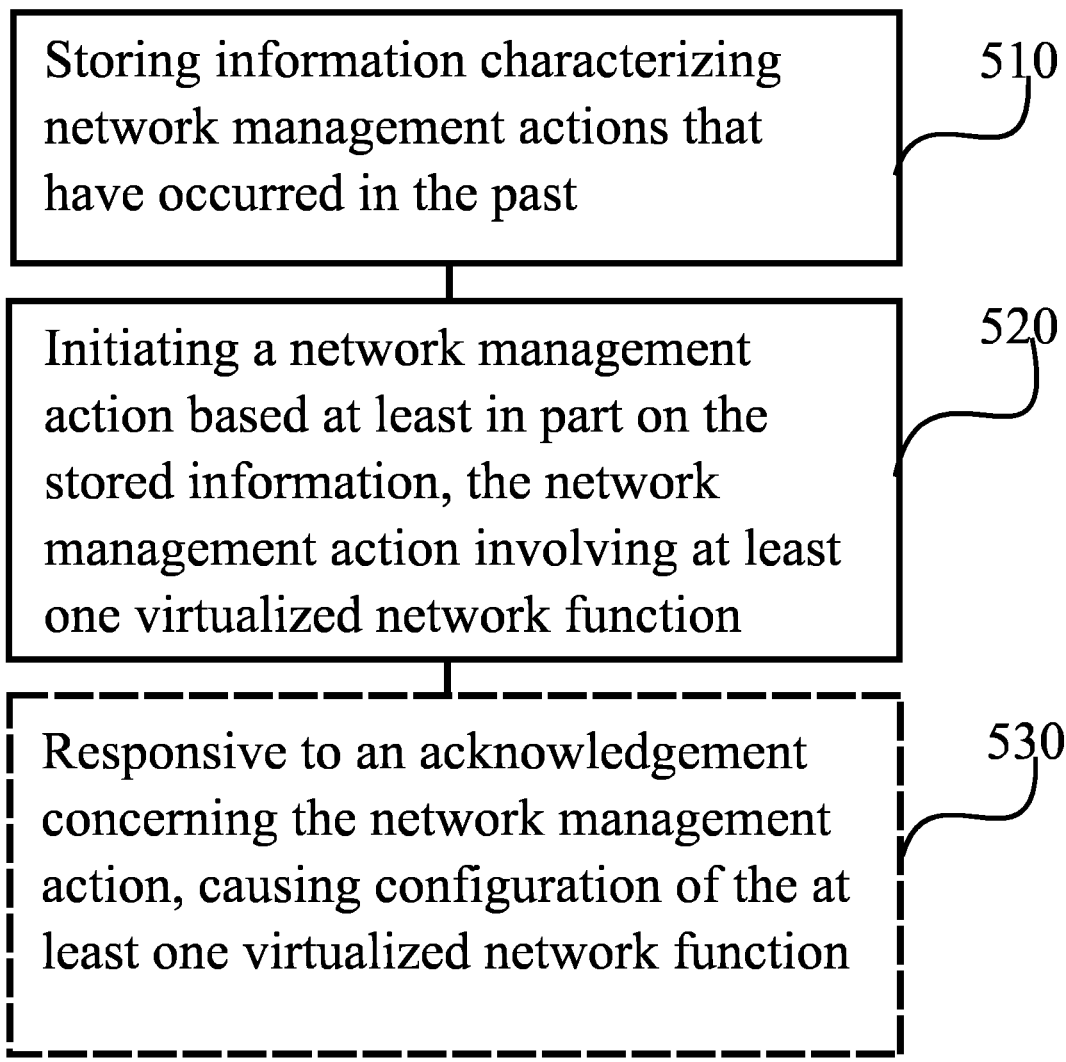
FIG. 5 is a first flow chart of a first method in accordance with at least some embodiments of the present invention.

FIG. 5 is a first flow chart of a first method in accordance with at least some embodiments of the present invention. The phases of the illustrated method may take place in a VNFM or other network management node comprised in a network that employs, at least in part, network function virtualization.

Phase 510 comprises storing information characterizing network management actions that have occurred in the past. Phase 520 comprises initiating a network management action based at least in part on the stored information, the network management action involving at least one virtualized network function. Optional phase 530 comprises, responsive to an acknowledgement concerning the network management action, causing configuration of the at least one virtualized network function.

Figure 6:
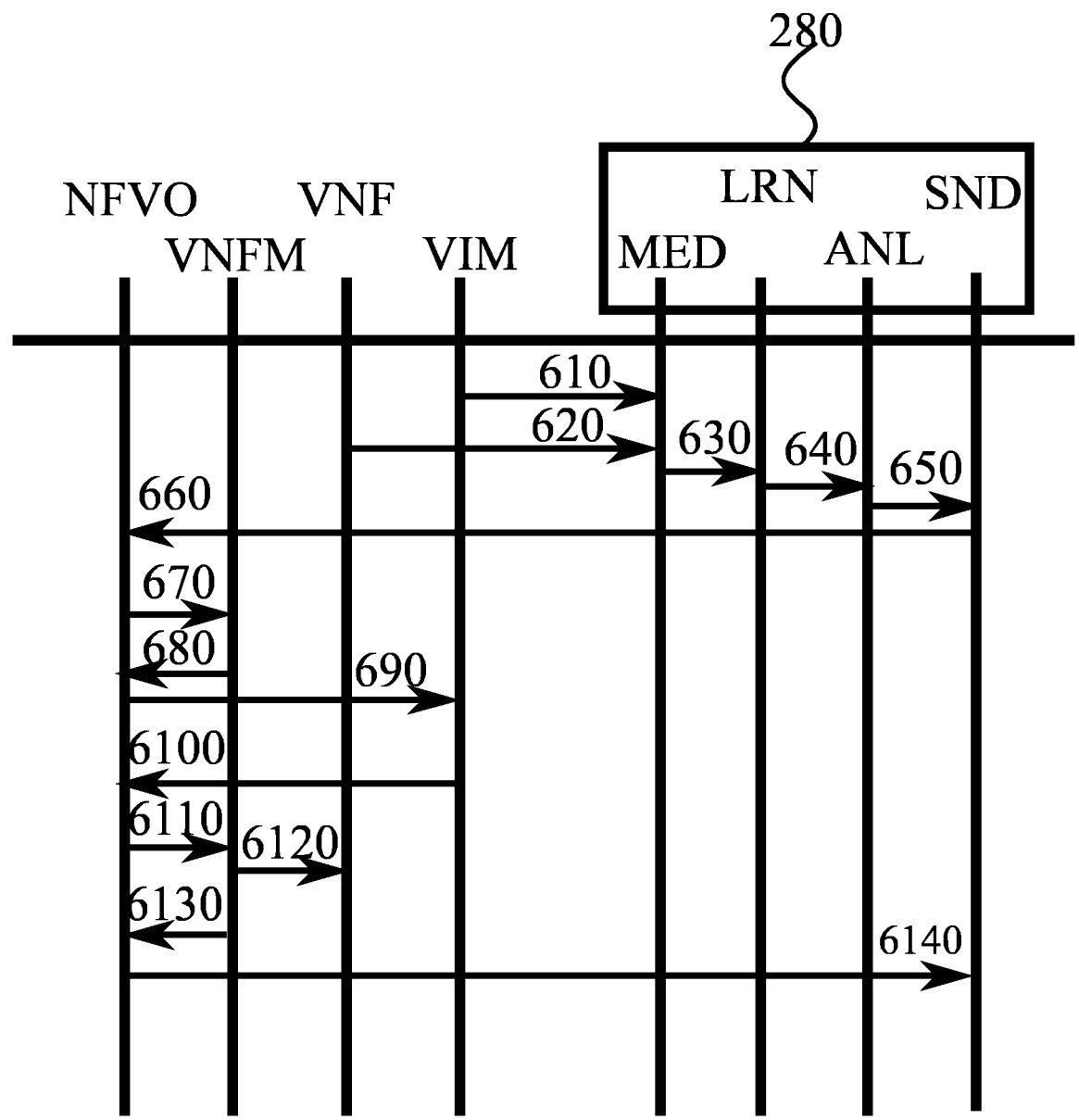
FIG. 6 illustrates signalling in accordance with at least some embodiments of the present invention

FIG. 6 illustrates signalling in accordance with at least some embodiments of the present invention. On the vertical axes are disposed, from left to right, an NFVO, a VNF Manager VNFM, a VNF, a VIM, a mediation function MED, a machine learning function LRN, an analytics engine ANL and, finally, a sender SND. Mediation function MED, machine learning function LRN, sender SND and analytics engine ANL may be functions comprised in a predictive entity such as predictive entity 280 of FIG. 2, for example. Sender SND may be seen, in general, as a function of predictive entity 280 that is tasked with communicating with the NFVO and, optionally, other nodes in the network. Sender SND may be, at least in part, comprised in at least one of mediation function MED, machine learning function LRN and/or analytics engine ANL.

Phase 610 comprises the mediation function MED receiving, from the VIM and/or VNFI, information concerning VNF utilisation of resources. Phase 620 may comprise the mediation function MED receiving from at least one VNF information on operation of the VNF, for example, in the form of systems logs and parameters. Application status information may be provided in phase 620. The messaging of phases 610 and 620 may be initiated by the VNF and VNFI respectively, or the information may be requested, and responsively received, by mediation function MED.

Phase 630 may comprise the mediation function MED providing information, such as for example enhanced information determined based on the information received in mediation node MED during phases 610 and/or 620, to machine learning function LRN, which may be configured to apply at least one machine learning principle to the information to thereby determine at least one pattern and/or propensity score. The information provided by mediation function MED may be filtered and/or enriched with further information from third parties or databases. In some embodiments, the information provided by mediation function MED is simply formatted into a format that machine learning function LRN can process it.

In phase 640, machine learning function LRN makes the determined at least one pattern and/or propensity score, or other determined characteristic, available to analytics engine ANL.

In phase 650, analytics engine ANL predictively initiates a network management action, as described above. In the example of FIG. 6, the network management action comprises a scale-out action where a VNF is instantiated pre-emptively, without waiting for an indication the system is highly loaded. A high-load indication could be delivered, for example, by notifying the VNFM. The triggering signal of phase 650 is fed to the NFVO in phase 660 to thereby cause its implementation.

Responsive to phase 660, the NFVO may validate the request, for example by checking a credential comprised in the message of phase 660. In phase 670, the NFVO signals to the VNFM to instantiate the VNF. The VNFM may validate the request of phase 670, and return, in phase 680, a resource allocation instruction to the NFVO.

Phase 670 may optionally further comprise the NFVO informing the VNFM of need to scale. If phase 670 comprises this optional phase, phase 680 may further comprise the VNFM informing the NFVO of resources needed for scaling. Also NFVO may check from the VNFM, whether the VNF is allowed to scale.

In phase 690, a resource allocation and/or interconnection setup message is transmitted from the NFVO to the VIM. This message may relate to allocation of computational, storage and/or networking resources to be allocated, for example. Responsively, the VIM may allocate the resources and virtual machines, and attach them to the network in accordance with the interconnection setup. Once the allocation is complete, the VIM may acknowledge completion of the allocation requested in phase 690 by transmitting a message, which is illustrated in FIG. 6 as phase 6100. The NFVO may acknowledge the resource allocation to the VNFM, phase 6110.

In some embodiments, the VNFM may notify an element manager, EM, of successful VNF instantiation as a response to the message of phase 6110. This is not illustrated in FIG. 6. The EM may responsively configure, at least in part, the VNF by signalling to the VNF. This configuration may relate to application specific parameters, for example.

In phase 6120, the VNFM configures, at least in part, the newly instantiated VNF. This configuration may relate to deployment specific parameters, for example. In phase 6130, the VNFM may acknowledge VNF instantiation to the NFVO, and in phase 6140 the NFVO may acknowledge VNF instantiation to the predictive entity 280.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system comprising:
a memory configured to store information characterizing past network management actions, the stored information including at least one propensity score indicating a likelihood that changing resources allocated to a particular virtualized network function will be necessary if a certain network operating condition exists and at least one temporal pattern indicating time periods, during which a certain section of a network experiences a particular load condition; and
at least one processing core configured to predictively initiate a preemptive network management action based at least in part on the stored information, the preemptive network management action involving at least one virtualized network function.

2. The system according to claim 1, wherein the preemptive network management action comprises at least one of the following: increasing resources allocated to a virtualized network function, decreasing resources allocated to a virtualized network function, starting a virtualized network function instance, and terminating a virtualized network function instance.

3. The system according to claim 1, wherein the system comprises a first node configured to determine, based on the past network management actions the at least one temporal pattern and the at least one propensity score.

4. The system according to claim 1, wherein the at least one processing core is configured to initiate the preemptive network management action based jointly on the at least one propensity score and a current network operating condition.

5. The system according to claim 1, wherein the at least one virtualized network function comprises at least one of the following: a virtualized base station function, a virtualized call session control function, CSCF, a virtualized switching centre, a virtualized mobility management entity, a virtualized home subscriber server, a virtualized equipment identity register and a virtualized gateway function.

6. The system according to claim 1, wherein the system is configured to override a first network management action request based at least in part on the stored information.

7. The system according to claim 6, wherein the first network management action request comprises a request to increase resources allocated to a first virtual network function, and the at least one processing core is configured to, based at least in part on the stored information, increase resources allocated to a second virtualized network function and leave resources of the first virtualized network function unmodified.

8. The system according to claim 6, wherein the first network management action request comprises a request to terminate a first virtualized network function and the stored information indicates that increased loading is likely in a near future.

9. The system according to claim 1, wherein the memory and the at least one processing core are comprised in a virtualized cellular communication network management device and the system further comprises a network functions virtualization orchestrator function configured to, responsive to a trigger from the virtualized cellular communication network management device, cause the preemptive network management action to be implemented.

10. A method comprising:
    storing information characterizing past network management actions, the stored information including at least one propensity score indicating a likelihood that changing resources allocated to a particular virtualized network function will be necessary if a certain network operating condition exists and at least one temporal pattern indicating time periods, during which a certain section of a communication network experiences a particular load condition; and
    predictively initiating a preemptive network management action based at least in part on the stored information, the preemptive network management action involving at least one virtualized network function.

11. The method according to claim 10, wherein the preemptive network management action comprises at least one of the following: increasing resources allocated to a virtualized network function, decreasing resources allocated to a virtualized network function, starting a virtualized network function instance, and terminating a virtualized network function instance.

12. The method according to claim 10, further comprising determining, based on the past network management actions, the at least one temporal pattern and the at least one propensity score.

13. The method according to claim 10, wherein the preemptive network management action is initiated based jointly on the at least one propensity score and a current network operating condition.

14. The method according to claim 10, wherein the at least one virtualized network function comprises at least one of the following: a virtualized base station function, a virtualized call session control function, CSCF, a virtualized switching centre, a virtualized mobility management entity, a virtualized home subscriber server, a virtualized equipment identity register and a virtualized gateway function.

15. The method according to claim 10, further comprising overriding a first network management action request based at least in part on the stored information.

16. The method according to claim 15, wherein the first network management action request comprises a request to terminate a first virtualized network function and the stored information indicates that increased loading is likely in a near future.

17. The method according to claim 15, wherein the first network management action request comprises a request to increase resources allocated to a first virtual network function, and the method comprises, based at least in part on the stored information, increasing resources allocated to a second virtualized network function and leaving resources of the first virtualized network function unmodified.

18. The method according to claim 10, wherein the method is performed in a virtualized cellular communication network management device, the method further comprising receiving, in a network functions virtualization orchestrator function, a trigger from the virtualized cellular communication network management device, and responsively causing the preemptive network management action to be implemented.

19. An apparatus comprising at least one processing core and at least one memory including computer program code, the at least one memory and the computer program code being configured to, with the at least one processing core, cause the apparatus at least to:
    store information characterizing past network management actions, the stored information including at least one propensity score indicating a likelihood that changing resources allocated to a particular virtualized network function will be necessary if a certain network operating condition exists and at least one temporal pattern indicating time periods, during which a certain section of a network experiences a particular load condition; and
    predictively initiate a preemptive network management action based at least in part on the stored information, the network management action involving at least one virtualized network function.

20. A non-transitory computer readable medium having stored thereon a set of computer readable instructions that, when executed by at least one processor, cause an apparatus to at least:
    store information characterizing past network management actions, the stored information including at least one propensity score indicating a likelihood that changing resources allocated to a particular virtualized network function will be necessary if a certain network operating condition exists and at least one temporal pattern indicating time periods, during which a certain section of a network experiences a particular load condition; and
    predictively initiate a preemptive network management action based at least in part on the stored information, the preemptive network management action involving at least one virtualized network function.

21. A method, comprising:
    predictively triggering, from a predictive entity, a preemptive network management action relating to a virtualized network function based on information characterizing past network management actions, the information including at least one propensity score indicating a likelihood that changing resources allocated to a particular virtualized network function will be necessary if a certain network operating condition exists and at least one temporal pattern indicating time periods, during which a certain section of a network experiences a particular load condition;
    responsive to the triggering, requesting implementation of the network management action by transmitting an instruction from a network function virtualization orchestrator function to a virtual infrastructure manager function, and
    responsive to a message from the virtual infrastructure manager function, requesting configuration relating to the network management action by transmitting a message from the network function virtualization orchestrator function to a virtualized network function manager function.

22. The method according to claim 21, wherein the configuration is caused by causing at least one message to be transmitted from the virtualized network function manager to the virtualized network function.

23. The method according to claim 21, further comprising, responsive to the triggering, querying by the network function virtualization orchestrator function from the virtualized network function manager function what resources are needed for implementing the preemptive network management action, and wherein the implementation is requested based at least in part on a response to the query.

* * * * *